(12) United States Patent
Todhunter (10) Patent No.: US 7,536,368 B2
(45) Date of Patent: May 19, 2009

(54) METHOD FOR PROBLEM FORMULATION AND FOR OBTAINING SOLUTIONS FROM A DATABASE

(75) Inventor: James Todhunter, Framingham, MA (US)

(73) Assignee: Invention Machine Corporation, Boston, MA (US)

( * ) Notice: Subject to any disclaimer, the term of this patent is extended or adjusted under 35 U.S.C. 154(b) by 462 days.

(21) Appl. No.: 10/723,633

(22) Filed: Nov. 26, 2003

(65) Prior Publication Data

US 2005/0114282 A1    May 26, 2005

(51) Int. Cl.
*G06F 17/00* (2006.01)
*G06N 5/00* (2006.01)

(52) U.S. Cl. .............. 706/45; 706/47; 706/55
(58) Field of Classification Search ............ 706/47, 706/55, 45; 707/4
See application file for complete search history.

(56) References Cited

U.S. PATENT DOCUMENTS

| | | | |
|---|---|---|---|
| 6,167,370 A * | 12/2000 | Tsourikov et al. ........... 704/9 |
| 6,792,418 B1 * | 9/2004 | Binnig et al. ............... 707/3 |
| 2001/0037328 A1 * | 11/2001 | Pustejovsky et al. .......... 707/3 |
| 2002/0010574 A1 * | 1/2002 | Tsourikov et al. ........... 704/9 |
| 2002/0055974 A1 * | 5/2002 | Hawkes et al. ............ 709/204 |
| 2002/0111811 A1 * | 8/2002 | Bares et al. ............... 704/275 |
| 2002/0120651 A1 * | 8/2002 | Pustejovsky et al. ........ 707/513 |
| 2004/0220893 A1 * | 11/2004 | Spivack et al. ............. 706/46 |
| 2005/0033711 A1 * | 2/2005 | Horvitz et al. .............. 706/50 |
| 2005/0044064 A1 * | 2/2005 | Haase ...................... 707/3 |
| 2005/0050096 A1 * | 3/2005 | Gomes et al. ............ 707/104.1 |

OTHER PUBLICATIONS

Ena T. Arel et al., TechOptimizer User Guide, 1995-2002, Invention Machine Corporation, Version 4.*
Invention Machine, TechOptimizer User Guide, Version 4.0, © 1995-2002 Invention Machine Corporation, Boston.

* cited by examiner

*Primary Examiner*—Joseph P Hirl
(74) *Attorney, Agent, or Firm*—Mills & Onello LLP (57) ABSTRACT

Problem analysis tool automatically reformulates a problem statement into a natural language or Boolean query that is automatically submitted via a knowledge search tool to a database, and responses to this query from the database are automatically provided.

28 Claims, 9 Drawing Sheets

METHOD FOR PROBLEM FORMULATION AND FOR OBTAINING SOLUTIONS FROM A DATABASE

BACKGROUND OF THE INVENTION

The process of innovation within organizations remains largely untouched by the general trend toward improved efficiency through automation. The traditional model of stimulating innovative thought is through the application of psychological techniques such as brainstorming. The techniques bring limited improvement to the process.

More recently, there have emerged a number of computer based technologies which can be applied by a researcher or designer who is considering the creation or improvement of a device, process, or other system. These technologies can be defined as problem analysis tools.

Problem analysis tools assist the user by enabling the user to consider a complex system and identify discrete problems which should be addressed. These tools accomplish this by providing computer based interfaces which assist in the application of well understood methods of problem analysis including, but are not limited to, root cause analysis, TRIZ, value engineering, function analysis, and system benchmarking. An example of such a tool, called TechOptimizer, is a computer system marketed by Invention Machine Corporation of Boston, Mass. The technology used in TechOptimizer to assist in problem analysis is partially described in U.S. Pat. Nos. 6,056,428 and 6,202,043. The system disclosed in these two patents is fully described in TechOptimizer user guide, version 4.0, Invention Machine Corporation, Boston, Mass.

The TechOptimizer software suite includes a module, which allows a user to build a functional model of the design and/or technological process, to perform value diagnostics of the design and/or technological process, identify a better (for example, higher value) configuration of the design and/or technological process, and identify what problem has to be solved in order to implement this new configuration.

Figure 1:
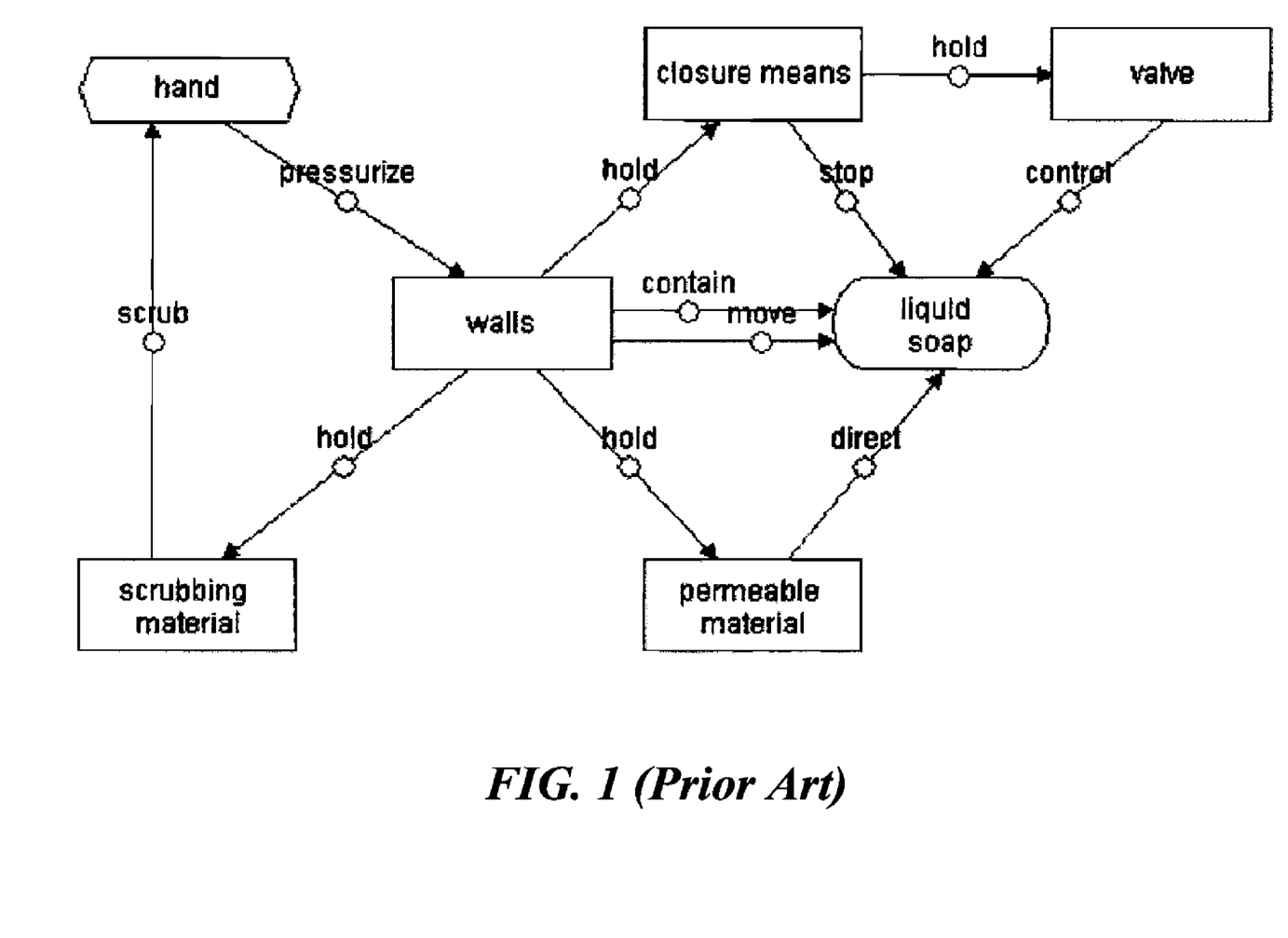
FIGS. 1, 2, and 3 are illustrative screens in the commercially available systems for solving engineering problems.
Figure 2:
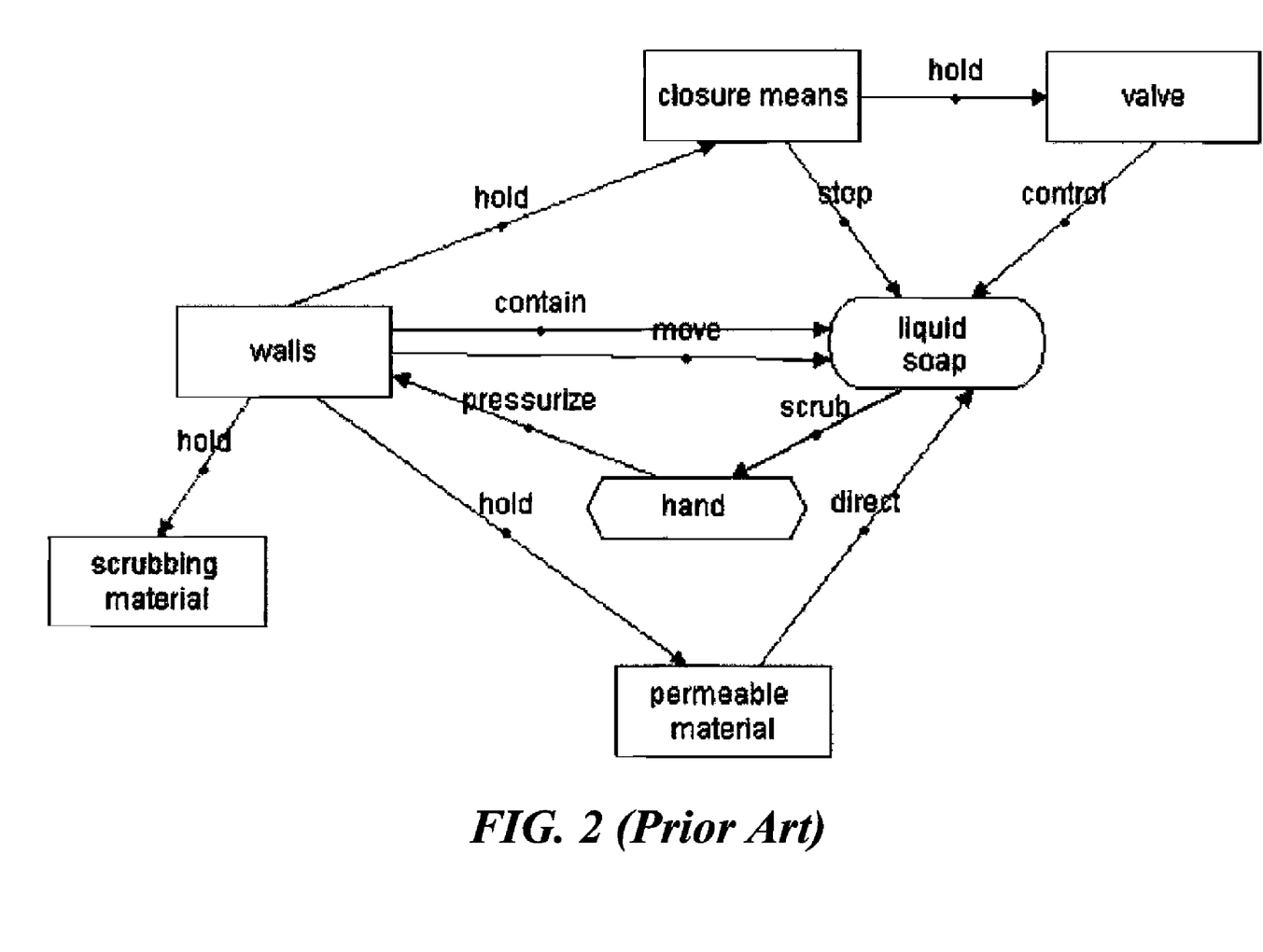
Figure 3:
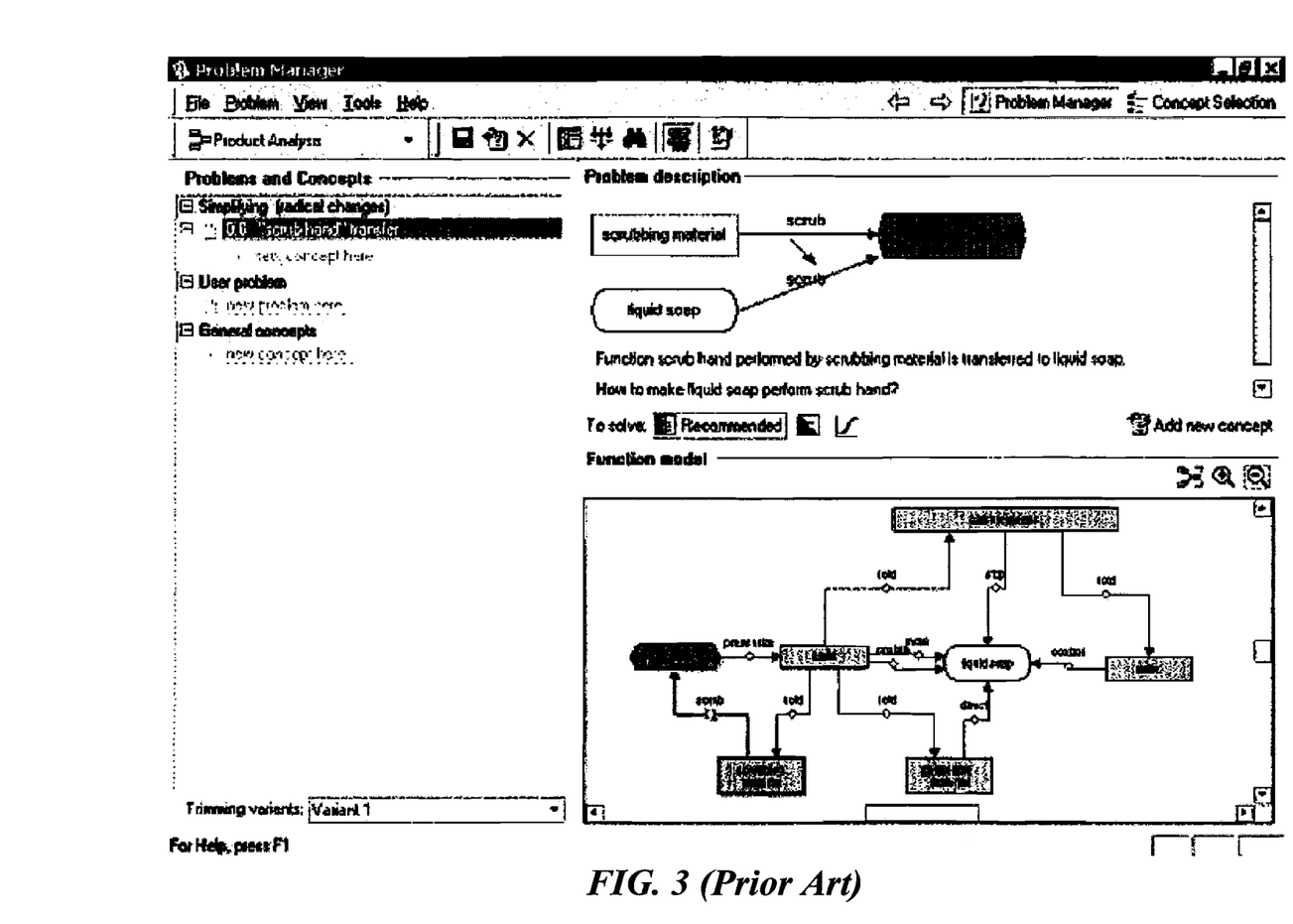

The deficiency with problem analysis tools is that while they greatly aid in the identification of specific issues to be address, they do not provide solutions to the identified problems. This can be understood by considering the following illustrative example. Consider an engineer who is trying to simplify the design of a soap dispenser. FIG. 1 illustrates a function model diagram of a soap dispenser which includes some scrubbing material. FIG. 2 shows a modified version of the soap dispenser model reflecting an intended change to the design of the bottle which eliminates the scrubbing material, yet preserves the scrubbing function by delegating that function to the liquid soap. This alternative design contains a new engineering problem that must be resolved in order to validate that this design is achievable—how can liquid soap perform a scrubbing function? FIG. 3 illustrates how a problem analysis tool might catalog and identify that problem for the engineer.

Once the problems have been identified, the user must conduct independent research using whatever means are available to find useful information. These means could include using books, public internet search engines, private data subscription services, internal enterprise portals, or other sources of relevant technical information.

BRIEF DESCRIPTION OF THE INVENTION

The present invention provides a method and system for using computer based systems to provide automated knowledge search capabilities in conjunction with problem analysis functions. In accordance with the principles of this invention, in one embodiment, problem analysis tools are augmented by the inclusion of knowledge search capabilities for databases, such that when a problem is identified, it is automatically re-formulated as a natural language or Boolean query to the databases, and responses to this query from the databases are automatically provided. In said embodiment, the machine representation of a problem statement generated by the problem analysis component is converted into a query appropriate to the available knowledge search technology. Different problem analysis tools will generate different specific machine representations, and similarly the target query format will vary with the knowledge search technologies applied. For example, a natural language query is suitable for search engines using semantic algorithms and a key word query for less sophisticated engines. There are a number of specific techniques which may be used to perform the mapping from a specific machine representation to a desired query, such techniques consisting of the steps of extracting key elements from the machine representation of the problem statement and subsequently reformulating those extracted elements to form a properly formed query.

In particular embodiment of a tool that uses functional analysis, the problem statement is reformulated by translating a functional relationship into a natural language query. In another embodiment of a tool that uses root cause analysis, the problem statement is reformulated by translating a node statement into a natural language query.

DETAILED DESCRIPTION OF ILLUSTRATIVE EMBODIMENTS OF THIS INVENTION

Figure 4:
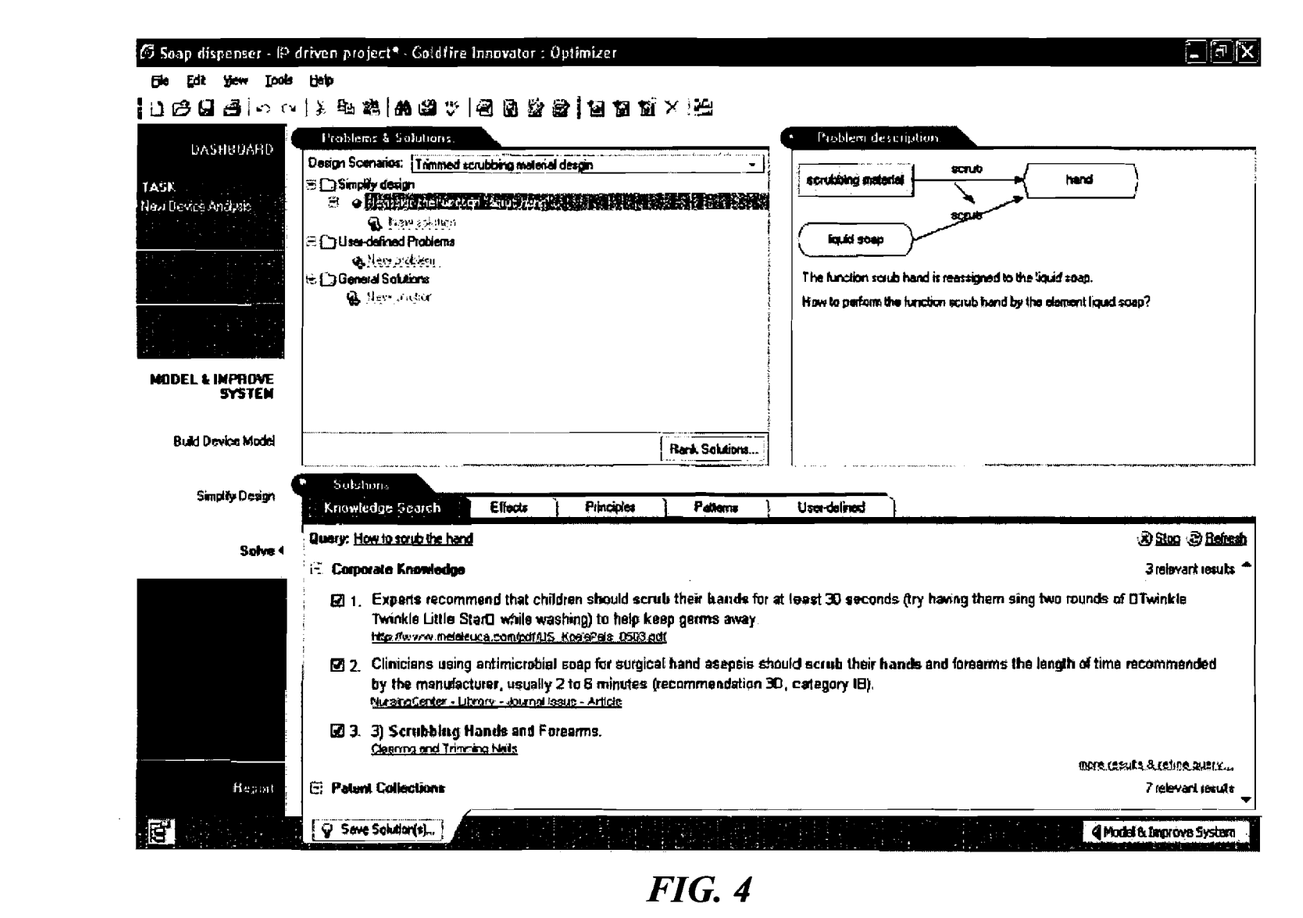
FIG. 4 is illustrative screen for problem identification, search query, and for a search response in a system in accordance with the principles of this invention.
Figure 5:
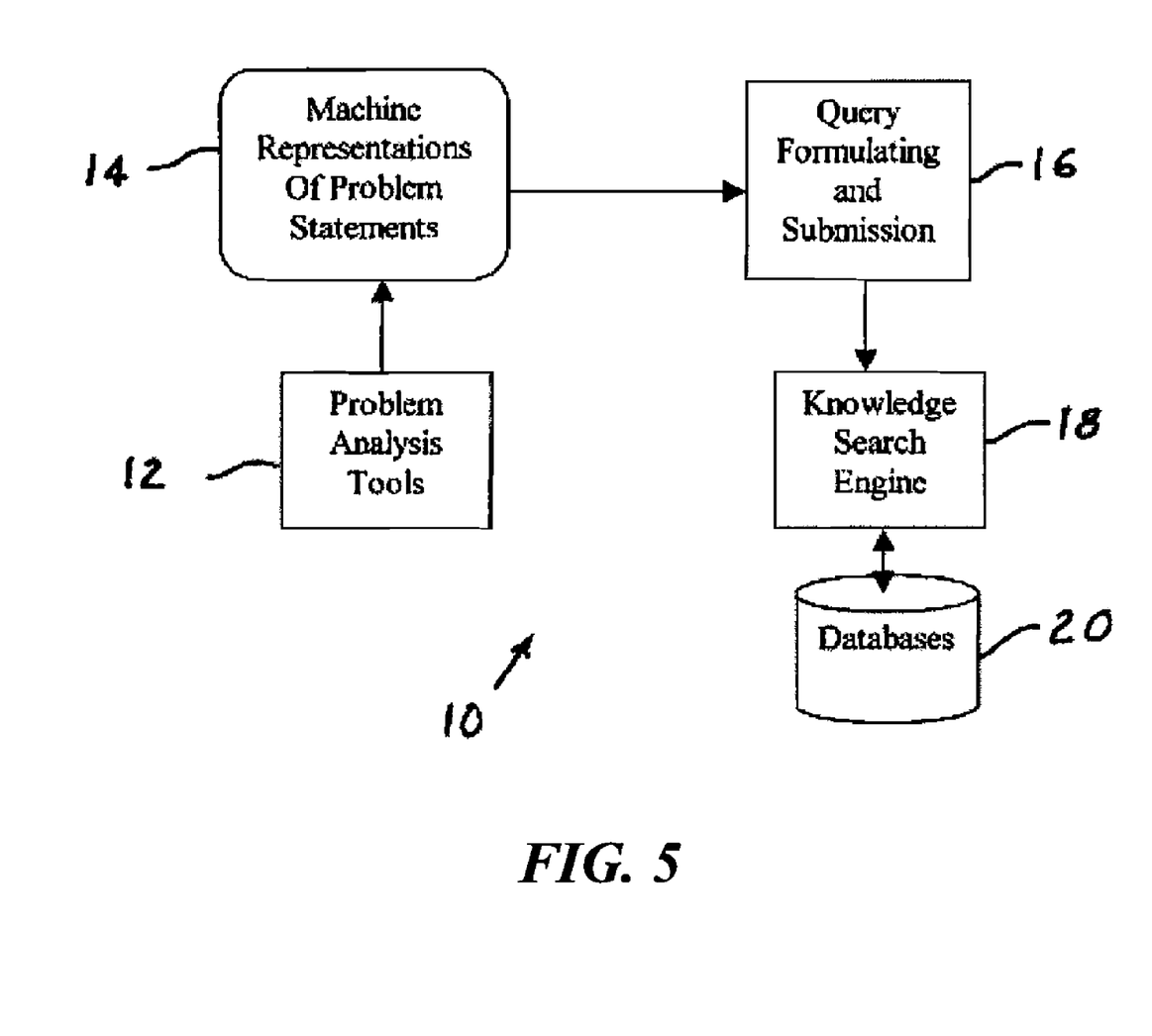
FIG. 5 is a high-level architecture diagram of one embodiment of a system in accordance with the principles of this invention.
Figure 6:
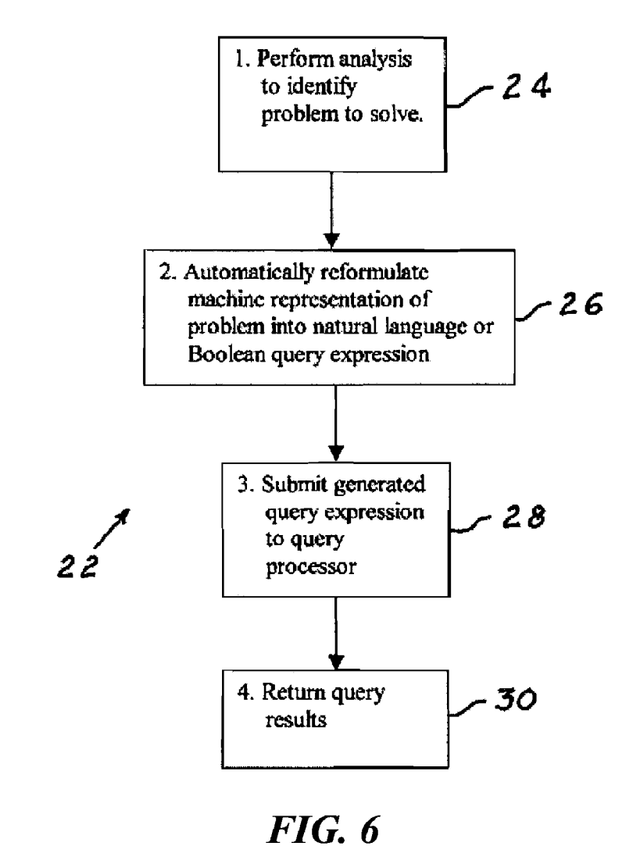
FIG. 6 is a flow diagram of a system in accordance with the principles of this invention.

Returning to the previously cited example illustrated by FIGS. 1, 2, and 3, with the system of the present invention, the problem analysis tool is augmented as shown in FIG. 4 to automatically suggest possible solutions to the identified problems. Such an embodiment could possess a high level architecture as shown in FIG. 5 comprising problem analysis tools 12, machine representations of problem statements 14, query formulation and submission 16, selected one or more knowledge search engines 18, and searchable databases 20. The system would facilitate a functional use model 22 as depicted in FIG. 6 including the following steps: to perform analysis of a system and identify problems to solve 24; when a problem is identified, it is automatically re-formulated as a natural language or Boolean query to the (for example, semantically indexed) database 26; the reformulated query is submitted to the knowledge search engine which implements searching of the database 28; and responses to this query from the database are automatically provided, 30 as shown in the Solutions window of FIG. 4.

One embodiment of this invention uses technologies described in U.S. Pat. Nos. 6,056,428 and 6,202,043 to provide problem analysis capabilities. Other problem analysis tools could be used in an alternative embodiment. This includes root cause analysis tools, for example.

In accordance with the principles of this invention one embodiment introduces two elements to the problem analysis tools.

One of these elements is a knowledge search tool. Knowledge search tools (also commonly referred to as search engines or database query tools) facilitate the efficient access to information stored in computer based database systems. When applicable, a knowledge search tool and a database to be searched by it are defined herein as a knowledge base. The user is able to locate relevant information by presenting a properly constructed query in an appropriate form (e.g. natural language or Boolean expression) to the knowledge search tool which searches the database and obtains results. The knowledge search tool responds to the entered query by constructing a result set comprising a list of information that meets the relevancy criteria imposed by the knowledge search tool. An example of such a knowledge search tool is a computer based system called Goldfire Intelligence marketed by Invention Machine Corporation, Boston, Mass. The technology used in this tool is partially described in U.S. Pat. No. 6,167,370 The content of which is incorporated herein by reference.

One embodiment of this invention uses the semantic indexing and search technology described in U.S. Pat. No. 6,167,370 for the purpose of performing knowledge searches. It will be apparent to the skilled practitioner that any other knowledge search tool could be used in an alternative embodiment.

Figure 8:
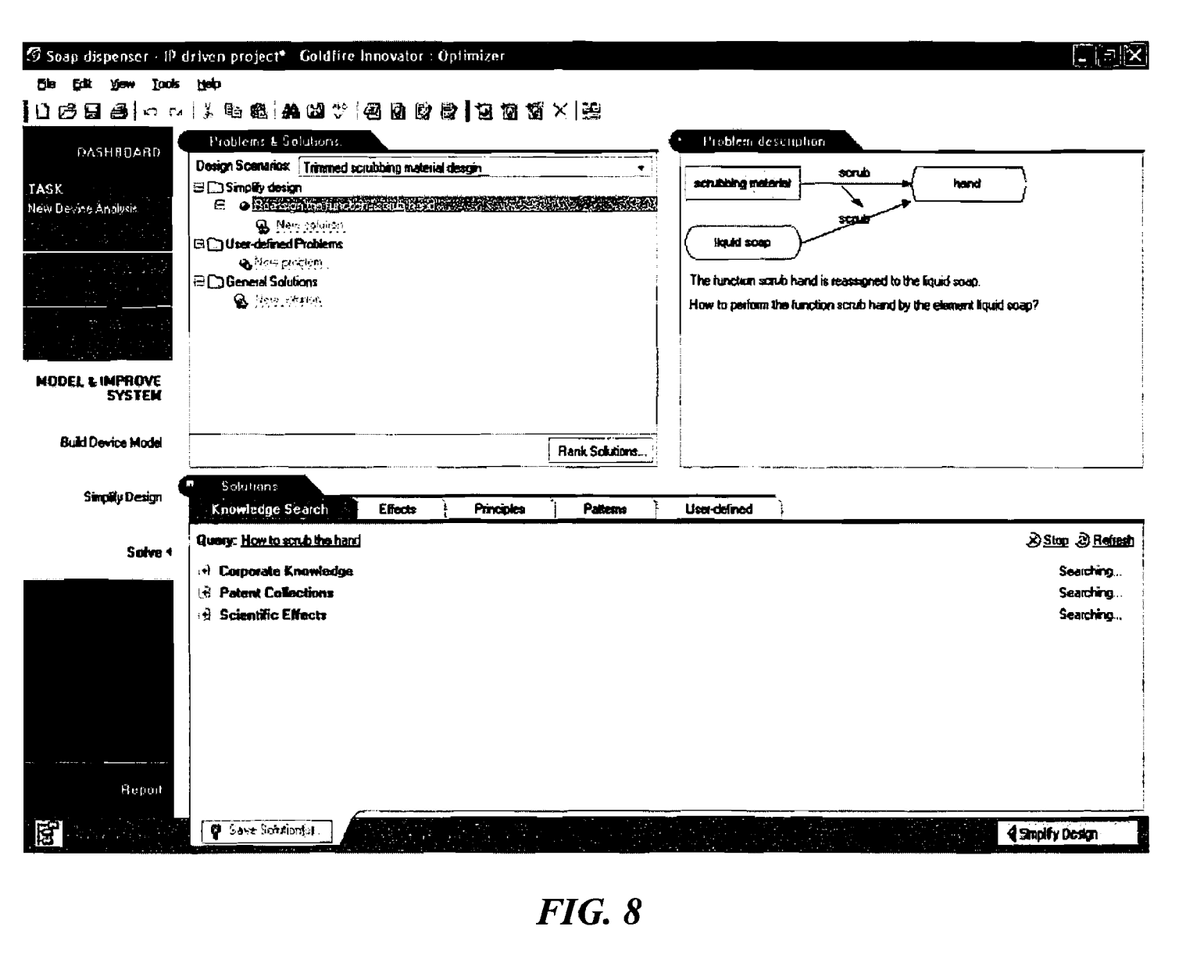
FIG. 8 is an illustrative screen showing a search underway in accordance with the principles of the invention.
Figure 9:
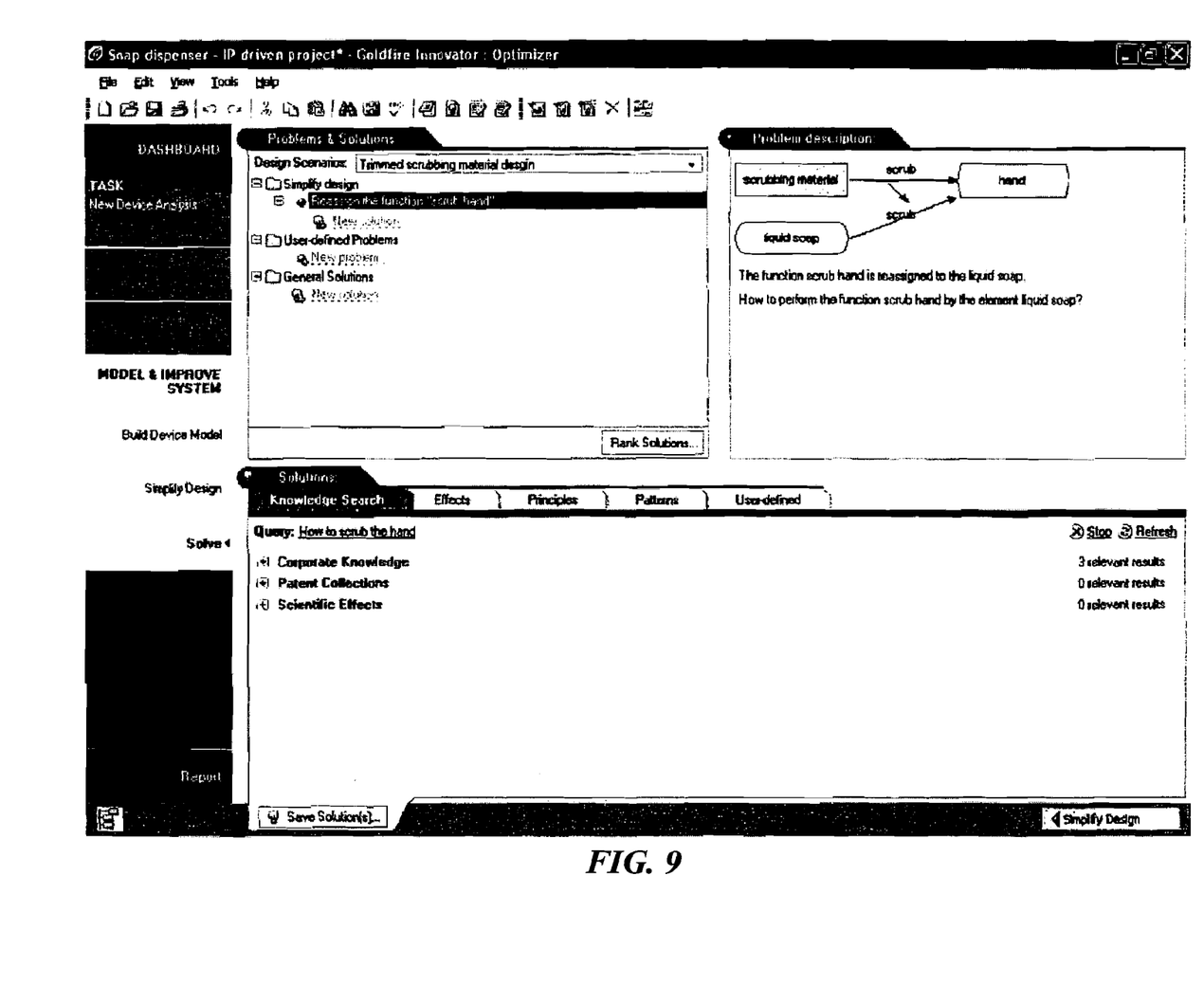
FIG. 9 is an illustrative screen showing the results of a search as in FIG. 8

The second element introduced to the problem analysis tools is a query formulator. In one embodiment, the machine representation of a function model is used as the source of key elements with which to build a query. For example, in FIG. 2, the arrow labeled "scrub" which connects the system component labeled "liquid soap" to the system component labeled "hand" represents the need to find a mechanism by which liquid soap can be made to scrub hands. Referring to FIG. 4, in this example, in one embodiment, the connecting arrow is interpreted as a desired action (scrub) and the system component labeled "hand" is interpreted as the object of the desired action (these are displayed at "Problem Description"). Along with the graphical display of the problem description the Problems & Solutions portion of the screen provides proposed approaches to solve the problem. Using the functional relationship the system constructs the query "How to scrub the hand?" as a query to be submitted to the knowledge search tool by automatic reformulation by translating the functional relationship into a natural language query. The query is shown in the Solutions portion of the screen which also shows the several types of knowledge bases that are available to the user. These knowledge bases are resident in three possible places. One is on the user's own computer memory, or portable memory devices such as CDs that can accessed at the user's location. Another is called Corporate Knowledge which is typically on one or more servers resident or privately accessible to user's within the organization such as a corporation. Another is publically accessible search engines and databases such as Google (a search engine) and the U.S. Patent and Trademark Office patent collection (a searchable database). In one embodiment, an entry in the Problem & Solutions window will be automatically selected (or it can be programmed to allow the user to select) and similarly will automatically start the searching of the three categories of databases. The software allows configuration by a user to, for example, rewrite the Query, and to limit the search. As shown in FIG. 8, the automatic (or user selected) search of all three categories is underway (see "searching" on the right side). In FIG. 9 there is shown that searching is completed with 3 relevant results in the Corporate Knowledge database, but no results in the other databases. FIG. 9 shows the results of the search posted along with necessary links to access the results.

Figure 7:
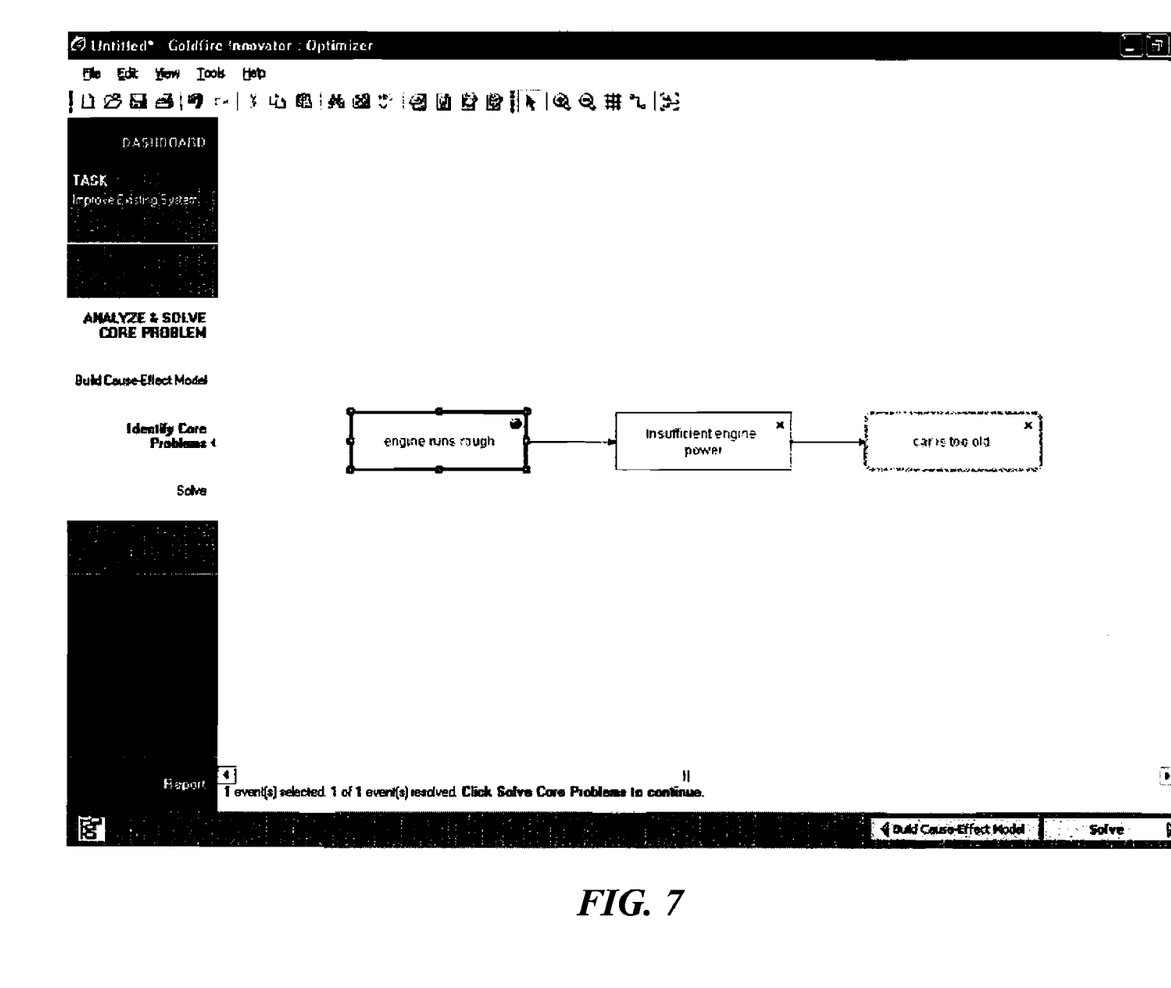
FIG. 7 is an illustrative screen showing a problem analysis tool for root cause analysis.

FIG. 7 shows a root cause analysis of a problem. The problem can be characterized starting with an undesirable event, namely "car is too old". The question is asked, why is the car too old, and the answer given is "insufficient engine power". That is, "insufficient power "is the cause of "car is too old", and similarly "engine runs rough" is the cause of "insufficient power". Such a root cause analysis will provide artifacts within the processor that can be reformulated as a natural language query.

It will be apparent to the skilled practitioner that in alternative embodiments the specific mechanism for extraction of key query elements from a given problem analysis tool's machine representation will vary with the tool as will the mechanism for construction of the automatically formed query. For example, FIG. 10 depicts a graphical representation corresponding to the results of using a problem analysis tool which automated the process of root cause analysis. In this situation, the result of the root cause analysis has a machine representation which is a directed graph wherein each node, a, b, c, of the graph represents a problem statement and each edge (shown as arrows connecting the nodes) of the graph represents a cause-effect relationship. In this case, the machine representation of each problem statement contains a well formed natural language fragment. Thus, if the user wishes to address the problem that the engine runs rough, since the user has the presumed goal of preventing the identified problem, by selecting the node a, "engine runs rough" the user gives the program an assignment to create the formulation of the query which it does by generating a statement of the form "How to prevent engine runs rough?", in which the node is translated into the query statement.

Since it is the case that relevant solutions to the problems identified through the use of a problem analysis tool often exist in the body of knowledge accessible via a knowledge search tool, this addition of these two new elements to the problem statement tools present immediate and compelling benefits to the user. A new model of use is enabled wherein the operations of problem analysis and applied research are no longer disjoint activities. Now, a single operation is made available which allows users to dynamically find potential solutions to issues as they are identified. This results in greater productivity as the tradition latency between problem identification and solution concept feasibility and practicability analysis is eliminated.

What is claimed is:

1. A system for obtaining solution suggestions for problems, the system comprising:

at least one processor and at least one storage medium including an electronic model of a system or process, wherein the electronic model includes components of the system or process and relationships between the components;

a problem analysis tool that analyzes the components and the relationships between the components of the electronic model to identify a problem to be solved, generates a problem statement representing the problem, and generates a machine representation of a problem statement;

a query formatter that reformulates the machine representation into a natural language query or Boolean query and automatically submits the query to at least one knowledge base; and the at least one knowledge base comprising at least one database comprising problem solutions and returning a set of solution suggestions responsive to the query.

2. The system of claim 1, wherein the query formatter translates functional relationships in the machine representation of the problem statement into semantic relationships.

3. The system of claim 1, wherein the query formatter reformulates the problem statement into a natural language query.

4. The system of claim 1, wherein the at least one knowledge base includes a semantic analysis knowledge base.

5. The system of claim 1, wherein the at least one knowledge base is resident on a storage medium co-located with the computer.

6. The system of claim 1, wherein the at least one knowledge base is resident on a corporate server.

7. The system of claim 1, wherein the at least one knowledge base is remotely accessed.

8. The system of claim 1, wherein the at least one knowledge base is a patent collection that is remotely accessed.

9. The system of claim 1, wherein at least one knowledge base includes a knowledge search tool that accesses a plurality of databases selected from a group including:
   at least one database resident on a storage medium co-located with the computer;
   at least one database on a corporate server; and
   at least one database accessible via an internet link.

10. The system of claim 9, wherein the at least one knowledge base includes a semantic analysis knowledge base.

11. The system of claim 1, wherein the at least one knowledge base includes a knowledge search tool that uses the query to automatically search the at least one database.

12. The system of claim 1, wherein:
   the problem analysis tool determines functional relationships between key components of the electronic model; and
   the query formatter translates the functional relationships into the natural language query.

13. The system of claim 1, wherein:
   the problem analysis tool performs a root cause analysis of the electronic model to generate a directed graph having one or more nodes, wherein each node represents a problem statement and has a node edge that represents a cause-effect relationship; and
   the query formatter translates the one or more nodes into the natural language query.

14. A computer program product stored on at least one storage medium for execution by one or more processors to perform a method of obtaining solution suggestions for problems, using a database including an electronic model of a system or process, wherein the electronic model includes components of the system or process and relationships between the components, said method comprising:
   analyzing the components and the relationships between the components of the electronic model to identify a problem to be solved;
   automatically generating a machine representation of the problem;
   reformulating the machine representation into a natural language or Boolean query;
   submitting the query to at least one knowledge base having problem solutions stored therein, and
   returning a set of solution suggestions responsive to the query from the at least one knowledge base.

15. The computer program product of claim 14, wherein reformulating the machine representation into a natural language or Boolean query includes translating functional relationships in the machine representation into semantic relationships.

16. The computer program product of claim 14, wherein one or more of the at least one knowledge base is a semantic analysis knowledge base.

17. The computer program product of claim 14, wherein the at least one knowledge base is resident on a storage medium co-located with at least one of the one or more processors.

18. The computer program product of claim 14, wherein the at least one knowledge base is resident on a corporate server.

19. The computer program product of claim 14, wherein the at least one knowledge base is remotely accessible.

20. The computer program product of claim 14, wherein the at least one knowledge base is a patent collection that is remotely accessible.

21. The computer program product of claim 14, wherein accessing at least one knowledge base includes using a knowledge search tool to access a plurality of databases comprising two or more of:
   at least one database resident on a storage medium co-located with at least one of the one or more processors;
   at least one database on a corporate server; and
   at least one database accessible by an internet link.

22. The computer program product of claim 21 wherein at least one of said knowledge bases is a semantic analysis knowledge base.

23. The computer program product of claim 14, wherein the method includes submitting the query to the at least one knowledge base without intervention by a user.

24. The computer program product of claim 14, wherein:
   identifying the problem to be solved includes determining functional relationships between key components of the electronic model; and
   reformulating the machine representation into the natural language query includes translating the functional relationships into the natural language query.

25. The computer program product of claim 14, wherein:
   identifying the problem to be solved includes performing a root cause analysis of the electronic model to generate a directed graph having one or more nodes, wherein each node represents a problem statement and has a node edge that represents a cause-effect relationship; and
   reformulating the machine representation into the natural language query includes translating the nodes into the natural language query.

26. A computer-based method of obtaining solution suggestions for problems, using an electronic model of a system or process, wherein the electronic model includes components of the system or process and relationships between the components, said method comprising the following computer executed steps:
   analyzing the components and the relationships between the components of the electronic model, including identifying a problem to be solved;
   generating a machine representation of the problem;
   reformulating the machine representation into a natural language or Boolean query;

automatically submitting the query to at least one knowledge base having solutions stored therein; and returning a set of solution suggestions responsive to the query from the at least one knowledge base.

27. The method of claim 26, further comprising presenting the set of solution suggestions via an output device.

28. A system for obtaining solution suggestions for problems, said system comprising:

at least one processor and at least one storage medium including an electronic model of a system or process, wherein the electronic model includes components of the system or process and relationships between the components;

a problem analysis tool that analyzes the components and the relationships between the components of the electronic model to identify a problem to be solved and generates a machine representation of the problem;

a query formatter that reformulates the machine representation into a natural language or Boolean query and automatically submits the query to at least one knowledge base; and the at least one knowledge base comprising:

at least one database comprising problem solutions; and a knowledge search tool that automatically returns a set of solution suggestions responsive to the query from the at least one database.

* * * * *